Patented July 6, 1954

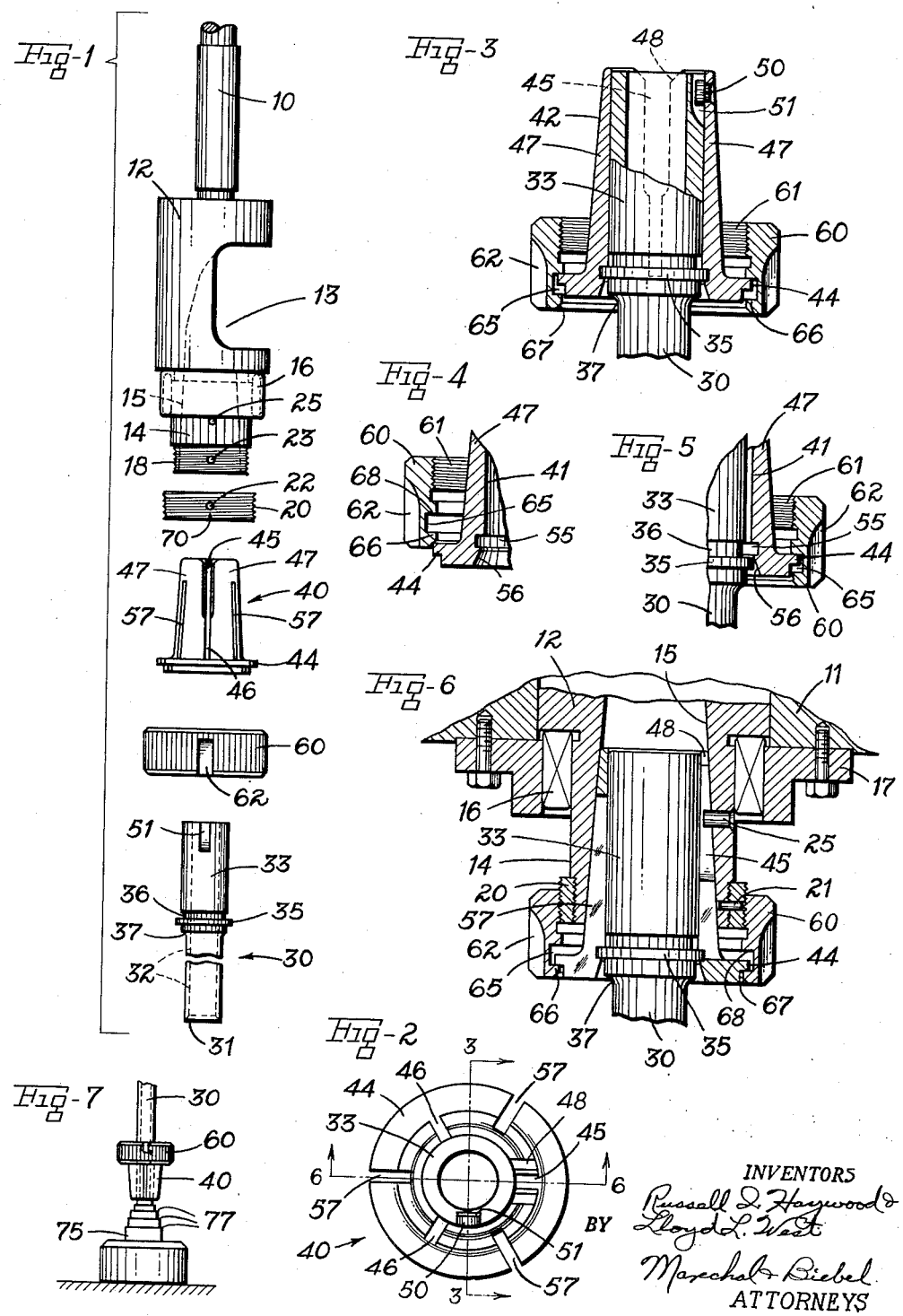

2,683,043

UNITED STATES PATENT OFFICE 2,683,043

HOLLOW DRILL ASSEMBLY

Russell I. Haywood and Lloyd L. West, Dayton, Ohio, assignors to Harris-Seybold Company, Cleveland, Ohio, a corporation of Delaware Application March 24, 1949, Serial No. 83,256

10 Claims. (Cl. 279—93)

This invention relates to drills and more particularly to hollow drill assemblies.

The invention has particular relation to hollow drills of the type used for forming holes in paper, leather and other materials where the holes are either to be used as such or in conjunction with additional slotting or slitting operations. The drill for such uses commonly comprises a hollow body having an inwardly beveled bottom cutting edge and an upper portion which is adapted to be gripped in suitable holding means carried by the drill head spindle in such manner that the drill is firmly secured and maintained in place when in operative position but is adapted to be quickly and easily removed when desired.

In hollow drill assemblies of this type wherein the drive connection between the drill and the spindle is provided by frictionally gripping the drill in a collet or like member carried by the spindle, if the torque on the drill should exceed the grip of the collet, as for example if the drill should bind in the work, the drill may twist in the spindle and cause considerable damage by galling either the spindle bore or the collet, or both. Also, in such assemblies it sometimes happens that the drill accidentally drops or is pulled away from the spindle during the up-stroke of the drilling operation.

It is accordingly one of the principal objects of the present invention to provide a hollow drill assembly of simple and effective construction in which the drill is driven from the spindle through a combination of frictional and positive connections to prevent relative rotation of the drill and the spindle during a drilling operation.

Another object of the invention is to provide a hollow drill assembly which includes a collet for securing the drill to the spindle and in which the collet is both frictionally and positively driven by the spindle and is in turn in both frictional and positive driving engagement with the drill to prevent relative rotation of any of these parts in use.

An additional object is to provide a hollow drill assembly in which the drill is positively retained in driven engagement with the spindle to prevent the drill from dropping or otherwise being accidentally removed from the spindle during use while at the same time being readily removable when desired for replacement.

Still another object is to provide a hollow drill assembly wherein the drill and the collet have cooperating portions which interfit upon simple axial insertion of the drill in the collet to effect positive retention of the drill in driving engagement with the collet.

It is also an object of the invention to provide a hollow drill assembly wherein the collet is positively retained within the spindle bore and wherein also the drill is positively retained in the collet but with the connections between these parts constructed and arranged for ready release when desired.

Other objects and advantages of the invention will be apparent from the following description, the accompanying drawing and the appended claims.

In the drawing—

Fig. 1 is an exploded view in elevation of the component parts of a drill assembly constructed in accordance with the present invention;

Fig. 2 is a top view in elevation of the assembled collet and drill members of the assembly of Fig. 1;

Fig. 3 is a vertical section through the collet, drill and retaining collar of the assembly, the section being taken as indicated by the line 3—3 of Fig. 2;

Fig. 4 is a fragmentary sectional view showing an intermediate stage in the assembly of the collet and retaining collar therefor;

Fig. 5 is a similar fragmentary section showing an intermediate stage in the assembly of a drill in the collet;

Fig. 6 is a sectional view through the complete assembly of Fig. 1, the section being taken as indicated by the line 6—6 of Fig. 2; and Fig. 7 is an elevational view on a smaller scale illustrating the operation of removing the drill from the collet.

Referring to the drawing, which illustrates a preferred embodiment of the invention, the drill head spindle is indicated at 10 as comprising a rod or bar of solid cylindrical section. This spindle is adapted to be received in a suitable drill head 11 (Fig. 6) for supporting and driving the same, a suitable construction for this purpose being the drill heads shown in the copending application of William R. Spiller and Lloyd L. West, Serial Number 718,380, filed December 26, 1946, now Patent No. 2,637,396 issued May 5, 1953, to the same assignee as this application. Below the cylindrical part 10 is an enlargement 12 which is milled to provide an opening 13 at one side through which the chips produced by the drill are discharged in operation. The lower portion 14 of the spindle is hollow, and its inner diameter is bored to provide a tapered socket 15 decreasing in diameter upwardly.

A suitable bearing 16 is mounted on the lower portion 14 of the spindle, between the spindle portion 14 and a retaining collar 17 bolted or otherwise secured to the drill head 11. The lower end of the spindle portion 14 is threaded at 18 to receive an interiorly and exteriorly threaded retaining nut 20, this nut 20 being locked in assembled position on the end of the spindle as by means of a pin 21 (Fig. 6) set in matching holes 22 and 23 in the nut and spindle respectively. A torque pin 25 is press fitted in a suitable receiving hole approximately midway of the spindle portion 14 and projects into the interior of the tapered bore 15 of the spindle.

The hollow drill is shown generally at 30 as having a lower beveled cutting edge 31 and a hollow bore 32 of substantial diameter with respect to the outside diameter of the drill to provide a passage through which the chips cut out by the drill may advance for discharge through the opening 13 in the spindle. The drill has a cylindrical shank portion 33 at its upper end, and below this shank portion at an intermediate location on the body of the drill is a shoulder 35 which extends outwardly beyond the outer circumference of the main drill body, the two sides of this shoulder being substantially parallel to each other and perpendicular to the axis of the drill. The drill shank is shown as undercut at 36 immediately above shoulder 35 to provide relief when grinding shank portion 33, and below this shoulder the diameter of the drill decreases over a radius as indicated at 37.

A collet 40 is provided for securing the drill 30 in driving engagement with spindle 10, and this collet has a cylindrical central bore 41 for receiving the drill shank 33. The collet 40 is formed with the major portion 42 of its outer surface tapering upwardly from a circumferentially arranged flange portion 44 adjacent its lower or outer end, and this tapered portion of the collet is split by means of three angularly spaced cuts or slots 45 and 46 to form a plurality of flexible tongues 47, these slots extending longitudinally of the collet from its upper end substantially to the flange 44. Thus when the drill shank is assembled in the collet 40 and these two parts then inserted in the spindle bore 15, the tapered surface 42 of the collet will cooperate with the complementary tapered inner wall of the bore 15 to urge the tongues 47 into frictional gripping engagement with the drill shank.

It will be noted that the slot 45 in the collet is of greater width over its upper end portion than the two slots 46, and the collet is inserted in the spindle bore in such angular position that the slot 45 will receive the torque pin 25 to form a positive driving connection between the spindle and collet with the pin acting as a key, the upper end of slot 45 being chamfered at 48 for quick guiding fit with pin 25. In addition, the upper end of one of the tongues 47 carries a drive pin 50 press fitted or otherwise secured thereto and projecting into the collet bore 41 to form a key, and the upper end of the drill shank is provided with a complementary slot 51 for receiving pin 50 to form a positive driving connection between the collet and drill supplementing the gripping action of the collet.

In order to effect positive retention of the drill 30 in assembled relation with collet 40, an internal circumferential groove 55 is provided near the outer or lower end of the collet to form a seat for receiving the shoulder 35 on the drill. The outer end of the collet bore has a lead-in tapered portion at 56, with this tapered portion arranged to overhang groove 55 when in its normal position. In addition, the outer end portion of the collet is provided with three cuts or slots 57 which are positioned in angularly spaced and alternating relation with the slots 45 and 46 and extend to points near the upper end of the collet to provide for ready deformation of the outer end of the collet. For example, these slots may extend to within approximately ¼ inch of the upper end of a collet having an overall length of 1¼ inches.

With this construction, when the drill shank is first inserted in the collet bore 41 with the collet removed from the spindle, the parts are readily adjusted by eye to bring the drill slot 51 into alignment with the drive pin 50, and the shank is readily received within the collet until the shoulder 35 engages the tapered portion 56 of the collet, as shown in Fig. 5. Then as the drill shank is forced further into the collet, the shoulder 35 and the tapered collet portion 56 cooperate with a camming action to effect resilient expansion of the outer end of the collet sufficiently to permit the shoulder 35 to enter and seat in the groove 55. The collet portion 56 then returns resiliently to its natural position of overlapping relationship with the lower surface of shoulder 35 to effect positive retention of the drill in assembled relation with the collet.

A nut or collar 60 is provided for releasably securing the collet 40 to the spindle, this collar having a portion 61 of its central bore threaded for attachment to the nut 20 on the lower end of the spindle and having notches 62 in its outer surface for receiving a suitable wrench. The collar 60 is also provided with a circumferential groove 65 adjacent its lower end for receiving the flange 44 on the collet, and the groove 65 is over-hung at the outer end of the collar by an annular shoulder 66 of smaller inner diameter than the outer diameter of the collet flange 44. This shoulder 66 has its outer surface tapered inwardly at 67 so that when the collar and collet are assembled as indicated in Fig. 4, the tapered surface 67 and the flange 44 will cooperate with a camming action to compress the outer end of the collet sufficiently to permit flange 44 to enter groove 65.

It will thus be seen that the flexibility imparted to the outer end of collet 40 by the slots 57 is sufficient to permit both the expansion of this end of the collet to receive the shoulder 35 on the drill and also the contraction of the collet for assembly with collar 60. In addition, the diameter of groove 65 is sufficiently greater than the outer diameter of flange 44 to permit a drill to be mounted in the collet or removed therefrom without disassembly of the collet and collar, satisfactory results having been obtained with a difference of the order of 0.093 inch between these diameters. In addition, the axial dimension of groove 65, from shoulder 66 to the inner shoulder 68, is substantially greater than the corresponding dimension of the collet flange 44, for example a difference of the order of 2 to 1.

In assembling the collet and drill for use with the drill head spindle, the collet 40 and collar 60 are first assembled as described in connection with Fig. 4. The drill is then inserted and snapped in place within the collet as described in connection with Fig. 5, the clearance provided for flange 44 in the collar groove 65 being adequate to permit this assembly step. The upper end of the collet is then inserted in the spindle bore 15, and in order to aid alignment of the slot 45 with the torque pin 25 of the spindle, a witness mark 70 is provided on nut 20, the holes 22 and 23 in the nut and spindle being properly positioned to locate mark 70 in line with pin 25 when these holes coincide for receiving pin 21. The retainer 60 is then threaded on the nut 20 to secure the collet to the spindle, and during this step the shoulder 66 engages the collet flange 44 to force the collet into tight frictional engagement with the walls of the spindle bore and thus to effect frictional gripping between the collet fingers 47 and the drill shank 33.

It will accordingly be seen that with the parts thus assembled as shown in Fig. 6, the collet is in both frictional and positive driving engagement with the spindle, the positive engagement being provided by the pin 25 and slot 45, and also the collet and drill shank are in positive as well as frictional driving engagement as a result of cooperation between the drive pin 50 and slot 51. In addition, since the shoulder 35 on the drill bears against the inner wall of groove 55 under the thrust load on the drill in use, and since the collet flange 44 has substantial axial clearance in the collar groove 65, the collet is free to move inwardly of the spindle to the full extent permitted by the axial dimension of groove 65 during operation, thus effecting increased frictional gripping of both the drill and the collet under the thrust load in use. At the same time, since the drill is positively retained in the collet by the seating of shoulder 35 in groove 55, it cannot pull out or drop away from the spindle during the up-stroke of the drilling operation.

When it is desired to remove or replace the drill, the collet is first removed from the spindle by unscrewing the retainer 60, and it will be noted that this operation can be performed without the use of a prying tool, since as the retainer is unscrewed, its shoulder 66 will engage the upper side of the collet flange 44 and thus positively draw the collet out of spindle bore 15. Removal of the drill from the collet is then effected with the aid of a drill remover shown at 75 in Fig. 7 and comprising a block having a series of stepped annular shoulders 77 graduated in size to fit drills and collets of different diameters. To remove the drill, the collet is inverted and placed on the drill remover with the shoulder 77 of the proper size engaging the end of the drill shank. Axial pressure is then applied manually to the larger end of the collet until it expands sufficiently to free shoulder 35 from groove 55, and it will be noted that the radial clearance provided for collet shoulder 44 in groove 65 makes it unnecessary to remove the collar 60 from the collet in connection with the removal or replacement of a drill.

It will accordingly be seen that the invention provides a hollow drill assembly of simple construction which affords substantial advantages in operation. The positive driving connections established between the drill and the spindle in addition to the frictional gripping action of the collet effectively prevent relative rotation of these parts such as otherwise might cause injury thereto. Furthermore, with the drill and collet positively retained in assembled relation with the spindle, the possibility of accidental removal or disconnection of the drill in use is avoided, thus promoting efficient operation. At the same time, the construction of the parts is such as to facilitate rapid disassembly when desired to remove or release the drill.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A hollow drill assembly of the character described comprising a drill head spindle having a tapered bore, a collet receivable within said spindle bore and having a central bore, a drill including a portion receivable within said collet bore, a major outer portion of said collet being tapered to be received within said spindle bore for inward deflection thereby into frictional gripping engagement with said drill portion and simultaneous frictional engagement with said spindle bore upon movement of said collet inwardly of said tapered spindle bore, said collet and said drill having cooperating portions arranged for resiliently interfitting engagement when said drill portion is in operative position within said collet bore to retain said drill and said collet in assembled relation when said collet is released from said tapered spindle bore, and means forming a positive driving connection between said collet and said drill preventing relative rotation thereof when said interfitting portions of said collet and drill are in interfitting relationship.

2. A hollow drill assembly of the character described comprising a drill head spindle having a bore for receiving a drill, an annular collet including an inner end portion receivable within said spindle bore, a drill including a shank portion receivable within said collet, said spindle bore and said inner end portion of said collet being constructed for cooperating engagement to effect frictional gripping of said drill shank with respect to said spindle, said drill having a shoulder thereon adjacent said shank portion, said collet having an annular seat therein for receiving said shoulder, and said collet having a resilient outer end portion overhanging said seat and adapted to be resiliently expanded by said shoulder upon insertion of said shank portion in said collet and thereafter to snap into overlapping relation with said shoulder when said shoulder is seated on said seat to retain said drill in assembled relation with said collet.

3. A hollow drill assembly adapted for use in a drill head spindle having a tapered bore, comprising a drill including a shank portion and a circumferentially arranged shoulder adjacent said shank portion, a collet having a central bore receiving said drill shank, the inner end portion of said collet being receivable within said tapered spindle bore and having a slot therein extending longitudinally from the end thereof to provide for compression of said collet end portion into frictionally gripping engagement with said drill shank when said collet and drill are inserted in said spindle bore, the outer end portion of said collet having an internal groove for receiving said shoulder on said drill, said outer end of said collet having a longitudinal slot therein at a position spaced angularly from said inner end slot to provide for resilient expansion of said outer end portion of said collet upon insertion of said drill shank therein to seat said shoulder in said groove and thereby to retain said drill in assembled relation with said collet.

4. A hollow drill assembly of the character described for use with a drill head spindle having a tapered bore, comprising a collet receivable within said spindle bore and having a central bore, a drill including an upper portion receivable within said collet bore and to be gripped therein by contraction of said collet upon movement thereof into said tapered spindle bore, said collet and said drill having portions proportioned for resiliently interfitting engagement when said upper portion of said drill is in operative position within said collet bore to retain said drill in assembled relation with said collet when said collet is released from said tapered spindle bore, and a collar carried by said collet for releasably connecting said collet to said spindle, said collar and said collet having loosely interfitting portions to provide for release of said interfitting portions of said collet and drill without disconnecting said collet from said collar.

5. A hollow drill assembly of the character described for use with a hollow drill, comprising a drill head spindle having a tapered bore, a collet having a central bore receiving said drill, the inner end of said collet being tapered for frictional engagement within said tapered spindle bore, an annular collar for releasably connecting said collet to said spindle, said collet including a circumferential flange adjacent the outer end thereof, said collar having an internal circumferential groove receiving said flange therein, and said collet being resiliently compressible upon insertion thereof in said collar to effect seating of said flange in said groove.

6. A hollow drill assembly of the character described for use with a hollow drill, comprising a drill head spindle having a tapered bore, a collet having a tapered inner end for frictional engagement within said spindle bore, said collet having a central bore for receiving and frictionally gripping a portion of said drill, an annular collar for releasably connecting said collet to said spindle, said collet including a circumferential flange adjacent the outer end thereof, said collar having an internal groove receiving said flange therein, said collet being resiliently compressible upon insertion thereof in said collar to effect seating of said flange in said groove, said collar being constructed for threading on the outer end of said spindle to force said inner end of said collet into said spindle bore, and said groove being of a greater axial dimension than said flange to provide for movement of said collet with respect to said collar into said bore under the thrust load on said drill in use.

7. A hollow drill assembly adapted for use in a drill head spindle having a tapered bore, comprising a collet having a central bore receiving a drill, the inner end of said collet being tapered for frictional engagement within said spindle bore, a drill including a shank portion receivable within said collet, said drill having a shoulder thereon adjacent said shank portion, said collet having an internal circumferential groove adjacent the outer end thereof receiving and retaining said shoulder when said drill shank is in operative position within said collet, an annular collar for releasably connecting said collet to said spindle, said collet including a circumferential flange adjacent the outer end thereof, said collar having an internal circumferential groove receiving said flange therein, and said collet having a longitudinal slot in the outer end thereof to provide for resilient contraction of said collet upon insertion thereof in said collar to effect seating of said flange in said collar groove and for resilient expansion of said collet upon insertion of a drill therein to effect seating of said drill shoulder in said collet groove.

8. A hollow drill assembly adapted for use in a drill head spindle having a tapered bore, comprising a collet having a central bore receiving a drill, the inner end of said collet being tapered for frictional engagement within said spindle bore, a drill including a shank portion receivable within said collet, said drill having a shoulder thereon adjacent said shank portion, said collet having an internal circumferential groove adjacent the outer end thereof receiving and retaining said shoulder when said drill shank is in operative position within said collet, an annular collar for releasably connecting said collet to said spindle, said collet including a circumferential flange adjacent the outer end thereof, said collar having an internal circumferential groove receiving said flange therein, and said collet having a longitudinal slot in the outer end thereof to provide for resilient contraction of said collet upon insertion thereof in said collar to effect seating of said flange in said collar groove and for resilient expansion of said collet upon insertion of a drill therein to effect seating of said drill shoulder in said collet groove, said groove in said collar being sufficiently greater in diameter than the outer diameter of said flange to provide for expansion of said collet to remove a drill therefrom or to insert a drill therein while said flange is seated in said collar groove.

9. A hollow drill assembly comprising a spindle member having a tapered bore forming a socket, a collet having a normally cylindrical central bore, a hollow drill member including a cylindrical end portion receivable in said collet bore, the major outer portion of said collet being tapered to be received within said socket for radially inward deflection by said socket into frictional engagement with said drill and simultaneously for frictional engagement with said socket to effect a frictional connection between said drill member and said spindle member, said collet having an annular seat thereon adjacent the outer end of said bore therein, said drill member having a circumferential shoulder thereon adapted to engage said seat on said collet to effect movement of said collet axially inwardly of said socket for increased frictional engagement of said collet with said drill and said socket under the thrust load between said shoulder and said seat in use, said collet and said spindle having cooperating interfitting slot and projection portions forming a positive driving connection therebetween, and said slot portion being arranged generally axially of said assembly to provide for said axial movement of said collet under said thrust load in operation while substantially preventing angular movement of said collet with respect to said socket.

10. A hollow drill assembly comprising a spindle member having a tapered bore forming a socket, a collet having a normally cylindrical central bore, a hollow drill member including a cylindrical end portion receivable in said collet bore, the major outer portion of said collet being tapered to be received within said socket for radially inward deflection by said socket into frictional engagement with said drill and simultaneously for frictional engagement with said socket to effect a frictional connection between said drill member and said spindle member, said collet having an annular seat thereon adjacent the outer end of said bore therein, said drill member having a circumferential shoulder thereon adapted to engage said seat on said collet to effect movement of said collet axially inwardly of said socket for increased frictional engagement of said collet with said drill and said socket under the thrust load between said shoulder and said seat in use, said collet and said spindle having cooperating interfitting slot and projection portions forming a positive driving connection therebetween, said slot portion being arranged generally axially of said assembly to provide for said axial movement of said collet under said thrust load in operation while substantially preventing angular movement of said collet with respect to said socket, said collet having a projection thereon extending radially inward of said bore therein adjacent the upper end thereof, and said drill having a generally axially arranged slot in the upper end thereof for interfitting engagement with said projection on said collet upon assembly of said drill in said collet to provide a positive driving connection between said drill and said collet supplementing said frictional gripping of said drill in said collet.

References Cited in the file of this patent

UNITED STATES PATENTS

| Number | Name | Date |
|---|---|---|
| 1,393,040 | Richard et al. | Oct. 11, 1921 |
| 1,424,743 | Smith | Aug. 1, 1922 |
| 1,557,464 | Mick | Oct. 13, 1925 |
| 1,923,820 | Gorton | Aug. 22, 1933 |
| 2,141,786 | Helgerud | Dec. 27, 1938 |
| 2,465,837 | Benjamin et al. | Mar. 29, 1949 |
| 2,637,396 | Spiller et al. | May 5, 1953 |

FOREIGN PATENTS

| Number | Country | Date |
|---|---|---|
| 884,026 | France | July 30, 1943 |